(12) United States Patent
Kaplan

(10) Patent No.: US 12,508,241 B2
(45) Date of Patent: Dec. 30, 2025

(54) PERIPHERAL NERVE AGONISTS SUPPRESS INFLAMMATION

(71) Applicant: University of Pittsburgh—Of the Commonwealth System of Higher Education, Pittsburgh, PA (US)

(72) Inventor: Daniel H. Kaplan, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 961 days.

(21) Appl. No.: 17/637,951

(22) PCT Filed: Aug. 27, 2020

(86) PCT No.: PCT/US2020/048183
§ 371 (c)(1),
(2) Date: Feb. 24, 2022

(87) PCT Pub. No.: WO2021/041662
PCT Pub. Date: Mar. 4, 2021

(65) Prior Publication Data
US 2022/0273599 A1    Sep. 1, 2022

Related U.S. Application Data

(60) Provisional application No. 62/893,433, filed on Aug. 29, 2019.

(51) Int. Cl.
| | | |
|---|---|---|
| *A61K 31/198* | (2006.01) | |
| *A61P 17/02* | (2006.01) | |
| *A61P 17/04* | (2006.01) | |
| *A61P 17/06* | (2006.01) | |
| *A61P 17/10* | (2006.01) | |
| *A61P 29/00* | (2006.01) | |

(52) U.S. Cl.
CPC ............ *A61K 31/198* (2013.01); *A61P 17/02* (2018.01); *A61P 17/04* (2018.01); *A61P 17/06* (2018.01); *A61P 17/10* (2018.01); *A61P 29/00* (2018.01)

(58) Field of Classification Search
CPC .................................................. A61K 31/198
See application file for complete search history.

(56) References Cited

U.S. PATENT DOCUMENTS

| 7,956,218 B2 | 6/2011 | Molino et al. | |
|---|---|---|---|
| 2004/0002543 A1* | 1/2004 | Magnus | A61K 31/195 514/561 |
| 2014/0275256 A1 | 9/2014 | Moskowitz et al. | |
| 2015/0290181 A1 | 10/2015 | Lee et al. | |
| 2024/0358676 A1* | 10/2024 | Cross, III | A61K 31/198 |

FOREIGN PATENT DOCUMENTS

| FR | 1704 | 2/1963 |
|---|---|---|
| KR | 1020080004946 A | 1/2008 |

OTHER PUBLICATIONS

Xu et al. CAS: 178:225493, 2022.*
Nagai et al, "Action of carnosine and β-alanine on wound healing", Surgery, 1986, pp. 815-821, vol. 100.
Sun et al, "Trp channels and itch", Semin Immunopathol, 2015, pp. 293-307, vol. 38.
Avula et al., "The Mas-Related Gene Receptor MrgD Modulates Mucosal Mast Cell Infiltration During Intestinal Inflammation", AGA Abstracts, 2012, pp. s152, vol. 142:5:1, (erroneously cited as Adriaensen Dirk et al. in the International Search Report submitted herewith).
Benson et al., "Topical and Transdermal Drug Delivery: From Simple Potions to Smart Technologies", Current Drug Delivery, 2019, pp. 444-460, vol. 16:5.
Naik et al., "Inflammatory Memory Sensitizes Skin Epithelial Stem Cells to Tissue Damage", Nature, 2017, pp. 475-480, vol. 550:7677.
NCBI, "MRGPRD MAS related GPR family member D [ *Homo sapiens* (human) ]", updated May 13, 2022 (web page).
"Remington: The Science and Practice of Pharmacy", 2005, Lippincott Williams & Williams, 21st edition, eds. Beringer et al., Baltimore, MD and Easton, PA, Chapters 43, 44, 50, and 65.
Solinski et al., "Pharmacology and Signaling of MAS-Related G Protein-Coupled Receptors", Pharmacological Reviews, 2014, pp. 570-597, vol. 66:3.
Ueda et al., "Topical and Transdermal Drug Products", Pharmacopeial Forum, 2009, pp. 750-764, vol. 35:3.
Valent et al., "Definitions, Criteria and Global Classification of Mast Cell Disorders with Special Reference to Mast Cell Activation Syndromes: A Consensus Proposal", Int Arch Allergy Immunol., 2012, pp. 215-225, vol. 157:3.
Wang et al., "Mrgprd-Expressing Polymodal Nociceptive Neurons Innervate Most Known Classes of Substantia Gelatinosa Neurons", The Journal of Neuroscience, 2009, pp. 13202-13209, vol. 29:42.
Christensen et al., "Assessing Punctate Administration of Beta-alanine as a Potential Human Model of Non-histaminergic Itch," Acta Derm Venereol, 2019, pp. 222-223, vol. 99.
Gentilini et al., "GABA-mediated inhibition of the anaphylactic response in the guinea-pig trachea," British Journal of Pharmacology, 1995, pp. 389-394, vol. 115.

* cited by examiner

*Primary Examiner* — Rei Tsang Shiao
(74) *Attorney, Agent, or Firm* — The Webb Law Firm

(57) ABSTRACT

Provided herein are methods of treating conditions associated with activation or over-activation of mast cells is acute or chronic urticaria, mastocytosis or any subtype of mastocytosis, pseudo-allergy, any form of dermatitis, such as contact or atopic dermatitis, wound healing, rosacea, acne, or psoriasis, food allergy, or irritable bowel syndrome. The method comprises administering a MRGPRD agonist, such as beta alanine, GABA, β-AIBA, or 5-oxoETE to a patient to treat the condition. Topical, enteric, delayed-release, or aerosol dosage forms comprising beta-alanine also are provided.

20 Claims, 4 Drawing Sheets

PERIPHERAL NERVE AGONISTS SUPPRESS INFLAMMATION

CROSS REFERENCE TO RELATED APPLICATIONS

This application is the United States national phase of International Application No. PCT/US2020/048183 filed Aug. 27, 2020, and claims the benefit of U.S. Provisional Patent Application No. 62/893,433 filed Aug. 29, 2019, which is incorporated herein by reference in its entirety.

STATEMENT REGARDING FEDERAL FUNDING

This invention was made with government support under Grant No. AR067187 awarded by the National Institutes of Health. The government has certain rights in the invention.

Provided herein are methods and compositions for suppression of inflammation in the skin and mucosa. The methods and compositions are useful in treating conditions driven by mast-cell activation, including, for example and without limitation: urticaria, mastocytosis, allergy, eczema, allergic contact dermatitis, irritable bowel syndrome, and food allergy.

Mast cells have an important immunoregulatory function, including in the skin and at the mucosal border between the body and the environment. They are an important part of the innate immune system and are abundant in barrier organs such as the skin. Mast cells express many activating receptors including the Fc region of immunoglobulin (Ig)E and certain classes of IgG that enable the binding of antibodies to the cell surface. The introduction of an antigen causes a mast-cell granulated release of numerous inflammatory mediators such as histamine and serotonin (mast cell activation). Mast cells also express surface Mas-related G protein receptors. These receptors bind to specific ligands including the neuropeptide Substance P, the antimicrobial peptide LL37 as well as exogenous agents such as certain drugs and components of house dust mites. Engagement of this receptor results in release of several biologically active molecules including cytokines and proteases, which are crucial to allergic reactions, anaphylactic-type responses and some inflammatory diseases. These reactions may be attenuated by the use of medications that inhibit the release of mast-cell mediators, called mast-cell stabilizers, or the actions of mediators such as antihistamines.

A number of conditions (e.g., pathologies or diseases) implicate mast cell activation, including, without limitation: urticaria, mastocytosis (e.g. cutaneous or systemic), allergy, eczema, allergic contact dermatitis, irritable bowel syndrome, and food allergy.

Mast cells are an important part of the innate immune system and are abundant in barrier organs such as the skin. Although mast cells are known primarily for initiating allergic reactions, many other biological functions have now been described for these cells. Studies have indicated that during wound repair mast cells enhance acute inflammation, stimulate re-epithelialization and angiogenesis, and promote scarring. Mast cells have also been linked to abnormal healing, with high numbers of MCs observed in chronic wounds, hypertrophic scars and keloids.

SUMMARY

Therapeutic agents that are effective to down-regulate, e.g., decrease or ameliorate, mast cell activation, or the effects thereof, are desired, as such therapeutic agents and uses thereof, in the treatment of conditions that result from mast-cell activation, are desired.

In a first aspect or embodiment of the invention a method is provided of treating a patient having a condition associated with activation or over-activation of mast cells, comprising administering to the patient an amount of as MRGPRD agonist effective to down-regulate mast cell degranulation in the patient.

In a second aspect or embodiment of the invention, the method of the first aspect or embodiment is provided, wherein the MRGPRD agonist is beta alanine (β-ala), or a pharmaceutically-acceptable salt thereof.

In a third aspect or embodiment of the invention, the method of the first aspect or embodiment is provided, wherein the MRGPRD agonist is gamma-aminobutyric acid (GABA), or a pharmaceutically-acceptable salt thereof.

In a fourth aspect or embodiment of the invention, the method of the first aspect or embodiment is provided, wherein the MRGPRD agonist is beta aminoisobutyric acid (β-AIBA), or a pharmaceutically-acceptable salt thereof, or 5-oxoeicosatetraenoic acid (5-oxoETE), or a pharmaceutically-acceptable salt thereof.

In a fifth aspect or embodiment of the invention, the method of any of the first through fourth aspect or embodiment is provided, wherein the condition associated with activation or over-activation of mast cells is a uticaria disease, and the MRGPRD agonist is administered to the patient topically or systemically.

In a sixth aspect or embodiment of the invention, the method of any of the first through fourth aspect or embodiment is provided, wherein the condition associated with activation or over-activation of mast cells is mastocytosis, and the MRGPRD agonist is administered to the patient topically or systemically.

In a seventh aspect or embodiment of the invention, the method of any of the first through fourth aspect or embodiment is provided, wherein the condition associated with activation or over-activation of mast cells is a food allergy, and the MRGPRD agonist is administered to the patient enterically (to, of for release in the patient's intestines), such as in an enteric or delayed-release oral dosage form.

In an eighth aspect or embodiment of the invention, the method of any of the first through fourth aspect or embodiment is provided, wherein the condition associated with activation or over-activation of mast cells is acute or chronic urticaria, mastocytosis or any subtype of mastocytosis, pseudo-allergy, any form of dermatitis, such as contact or atopic dermatitis, wound healing, rosacea, acne, or psoriasis comprising administering to the patient an amount of an MRGPRD agonist effective to inhibit or reduce inflammation in the patient, such as an amount effective to inhibit or decrease mast cell activation in the patient.

In a ninth aspect or embodiment of the invention, the method of any of the first through third aspect or embodiment is provided, wherein from 5 mg to 5000 mg or from 1 mg to 10 g of the MRGPRD agonist is administered to the patient.

In a tenth aspect or embodiment of the invention, the method of any of the first through third aspect or embodiment is provided, wherein the MRGPRD agonist is administered to the patient for at least one week.

In an eleventh aspect or embodiment of the invention, a method of treating a wound in a patient is provided, comprising administering to wound an amount of an MRGPRD agonist effective to increase wound healing in the patient.

In a twelfth aspect or embodiment of the invention, the method of the eleventh aspect or embodiment is provided, wherein the MRGPRD agonist is beta alanine (β-ala), or a pharmaceutically-acceptable salt thereof; gamma-aminobutyric acid (GABA), or a pharmaceutically-acceptable salt thereof; beta aminoisobutyric acid (β-AIBA), or a pharmaceutically-acceptable salt thereof; 5-oxoeicosatetraenoic acid (5-oxoETE), or a pharmaceutically-acceptable salt thereof or a combination of any of the preceding.

In a thirteenth aspect or embodiment of the invention, the method of the eleventh or twelfth aspect or embodiment is provided, wherein the MRGPRD agonist is formulated as a topical pharmaceutical composition.

In a fourteenth aspect or embodiment of the invention, the method of any of the eleventh through thirteenth aspect or embodiment is provided, wherein the wound is a non-healing wound.

In a fifteenth aspect or embodiment of the invention, the method of any of the eleventh through fourteenth aspect or embodiment is provided, wherein the patient is diabetic.

In a sixteenth aspect or embodiment of the invention, the method of the fifteenth aspect or embodiment is provided, wherein the wound is a diabetic foot ulcer.

In a seventeenth aspect or embodiment, a topical composition is provided comprising beta-alanine, or a pharmaceutically-acceptable salt thereof, in combination with a pharmaceutically-acceptable carrier.

In an eighteenth aspect or embodiment of the invention, the composition of the seventeenth aspect or embodiment is provided in an amount effective to treat a condition associated with activation or over-activation of mast cells, such as acute or chronic urticaria, mastocytosis or any subtype of mastocytosis, pseudo-allergy, any form of dermatitis, such as contact or atopic dermatitis, wound healing, rosacea, acne, or psoriasis.

In an nineteenth aspect or embodiment of the invention, the composition of the eighteenth aspect or embodiment is provided, wherein the composition is an ointment, a cream, a lotion, a spray, a gel, or a wound dressing.

In a twentieth aspect or embodiment, an aerosol or spray pharmaceutical formulation or device is provided, comprising beta-alanine, or a pharmaceutically-acceptable salt thereof, in combination with a pharmaceutically-acceptable carrier.

In a twenty-first aspect or embodiment of the invention, the aerosol or spray pharmaceutical formulation or device of the twentieth aspect or embodiment is provided in the form of a sprayer.

In a twenty-second aspect or embodiment of the invention, the aerosol or spray pharmaceutical formulation or device of the twentieth aspect or embodiment is provided in the form of a nasal sprayer.

In a twenty-third aspect or embodiment of the invention, the aerosol or spray pharmaceutical formulation or device of the twentieth aspect or embodiment is provided in the form of a metered-dose inhaler or a metered-dose sprayer.

In a twenty-fourth aspect or embodiment of the invention a delayed-release or enteric formulation is provided comprising beta-alanine, or a pharmaceutically-acceptable salt thereof, in a delayed-release and/or an enteric composition and/or within a delayed-release and/or an enteric coating, for enteric release of the beta-alanine in a patient (that is, the drug is released predominantly in a patient's intestine).

In a twenty-fifth aspect or embodiment of the invention method of preventing, reducing, or treating pain or itch in a patient, such as neurogenic inflammation, pain, or itch in a patient is provided, comprising administering to the patient an amount of an MRGPRD agonist effective to prevent, reduce, or treat pain or itching in a patient, such as an amount effective to inhibit or decrease mast cell activation in a patient.

DETAILED DESCRIPTION

Figure 1:
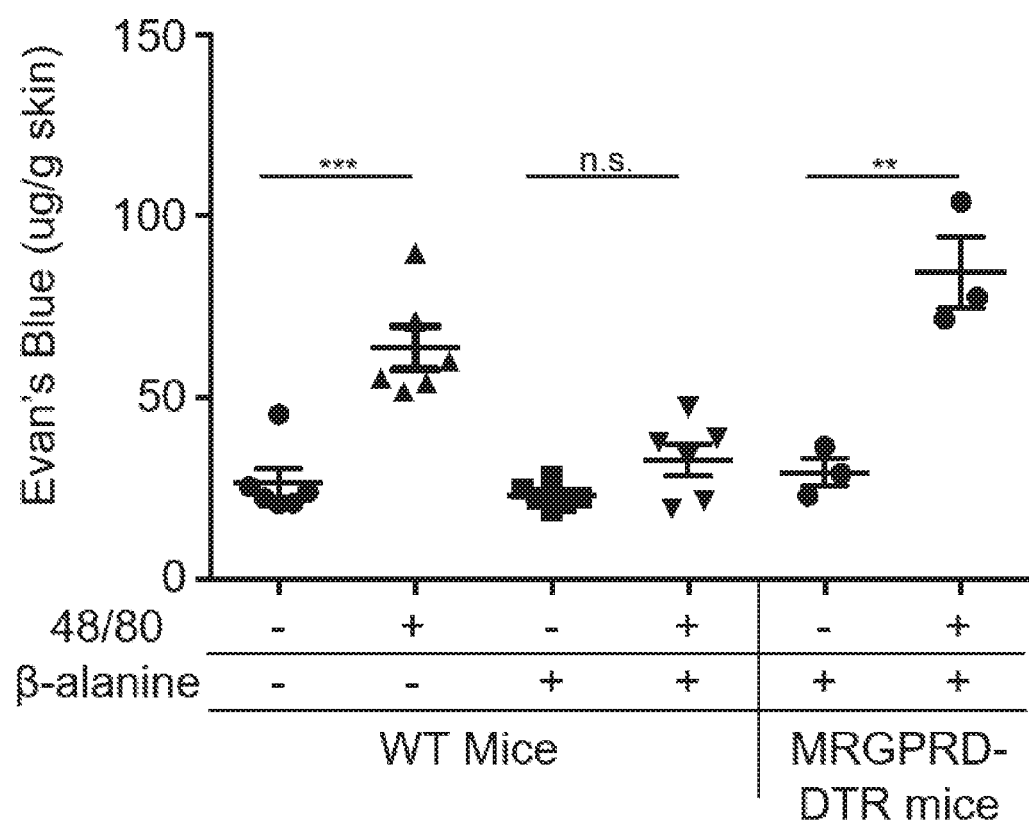
FIG. 1 is a graph showing that β-alanine suppresses 48/80-mediated mast cell degranulation, as described in Example 2.

The use of numerical values in the various ranges specified in this application, unless expressly indicated otherwise, are stated as approximations as though the minimum and maximum values within the stated ranges are both preceded by the word "about". In this manner, slight variations above and below the stated ranges can be used to achieve substantially the same results as values within the ranges. Also, unless indicated otherwise, the disclosure of these ranges is intended as a continuous range including every value between the minimum and maximum values.

As used herein, the terms "comprising," "comprise" or "comprised," and variations thereof, are meant to be open ended. The terms "a" and "an" are intended to refer to one or more.

A "condition" is a pathology, disease, disorder, sequelae, or any other abnormality or undesirable effect resulting from, in the context of the present disclosure, activation or over-activation of mast cells.

As used herein, a "patient" can be an animal, such as a mammal, including, but not limited to, a primate (such as a human, a non-human primate, e.g., a monkey, and a chimpanzee), a non-primate (such as a cow, a pig, a camel, a llama, a horse, a goat, a rabbit, a sheep, a hamster, a guinea pig, a cat, a dog, a rat, a mouse, a horse, and a whale), or a bird (e.g., a duck or a goose).

As used herein, the terms "treating", or "treatment" can refer to a beneficial or specific result, such as improving one of more functions, or symptoms of a condition, such as a condition resulting from, in the context of the present disclosure, activation or over-activation of mast cells. The terms "treating" or "treatment" can also include, but are not limited to, alleviation or amelioration of one or more symptoms of a condition resulting from, in the context of the present disclosure, activation or over-activation of mast cells. "Treatment" can also mean prolonging survival as compared to expected survival in the absence of treatment.

"Lower," in the context of a marker or symptom related to a condition, such as, in the context of the present disclosure, a condition related to the activation or over-activation of mast cells, can refer to a clinically-relevant and/or a statistically significant decrease in such level. The decrease can be, for example, at least 10%, at least 20%, at least 30%, at least 40%, or more, down to a level accepted as within the range of normal for an individual without such condition, or to below the level of detection of the assay. In certain aspects, the decrease can be down to a level accepted as within the range of normal for an individual without such condition, which can also be referred to as a normalization of a level. In certain aspects, the reduction can be the normalization of the level of a sign or symptom of a condition, that is, a reduction in the difference between the subject level of a sign of the condition and the normal level of the sign for the condition (e.g., to the upper level of normal when the value for the subject must be decreased to reach a normal value, and to the lower level of normal when the value for the subject must be increased to reach a normal level). The methods may include a clinically relevant inhibition of mast cell degranulation, as demonstrated by a clinically relevant outcome after treatment of a subject with an MRGPRD agonist, as described herein.

"Therapeutically effective amount," as used herein, can include the amount of an MRGPRD agonist as described herein that, when administered to a patient in need thereof, e.g. a patient having a condition that arises from activation or over-activation of mast cells, can be sufficient to effect treatment of the condition (e.g., by diminishing, ameliorating or maintaining the existing condition or one or more symptoms of the condition). The "therapeutically effective amount" may vary depending on the MRGPRD agonist agent, how the agent is administered, the condition and its severity and the history, age, weight, family history, genetic makeup, the types of preceding or concomitant treatments, if any, and other individual characteristics of the patient to be treated.

A "therapeutically-effective amount" can also include an amount of an agent that produces a local or systemic effect at a reasonable benefit/risk ratio applicable to any treatment. MRGPRD agonist agents employed in the methods and compositions described herein may be administered in a sufficient amount to produce a reasonable benefit/risk ratio applicable to such treatment.

For treatment of a patient, therapeutic compounds, e.g. MRGPRD agonists such as beta alanine (β-ala), gamma-aminobutyric acid (GABA), and/or beta aminoisobutyric acid (β-AIBA) can be administered by any effective route of administration, such as, without limitation, by: parenteral, administration, such as by intravenous, intraperitoneal, intra-organ, such as delivery to the liver, or intramuscular injection; by inhalation, e.g., in a spray or aerosol metered dose inhaler; topically, such as dermal, transdermal, otic, or ophthalmic delivery; transmucosally such as transvaginally or buccal; or orally. The composition may be administered as an individual dose, or in multiple doses over time, so as to maintain reduced mast-cell activation. Mucosal delivery includes, for example and without limitation, delivery to the mucosa of the respiratory system, gastrointestinal system, and intravaginally. The MRGPRD agonist can be delivered in a manner to target a particular tissue, such as the skin, rectum, intestine, or nasal cavity.

The MRGPRD agonist may be compounded or otherwise manufactured into a suitable composition for use, such as a pharmaceutical dosage form or drug product in which the compound is an active ingredient. Drug products may comprise a pharmaceutically acceptable carrier, or excipient. Therapeutic/pharmaceutical compositions are prepared in accordance with acceptable pharmaceutical procedures, such as described in *Remington: The Science and Practice of Pharmacy,* 21st edition, ed. Paul Beringer et al., Lippincott, Williams & Wilkins, Baltimore, MD Easton, Pa. (2005). Depending on the delivery route, the dosage form may comprise additional carriers or excipients, such as water, saline (e.g., normal saline), or phosphate-buffered saline, as are broadly-known in the pharmaceutical arts. Compositions may comprise a pharmaceutically acceptable carrier, or excipient. An excipient is an inactive substance used as a carrier for the active ingredients of a medication. Although "inactive," excipients may facilitate and aid in increasing the delivery, stability or bioavailability of an active ingredient in a drug product. Non-limiting examples of useful excipients include: anti-adherents, binders, rheology modifiers, coatings, disintegrants, emulsifiers, oils, buffers, salts, acids, bases, fillers, diluents, solvents, flavors, permeation enhancers, colorants, glidants, lubricants, preservatives, antioxidants, sorbents, vitamins, sweeteners, etc., as are available in the pharmaceutical/compounding arts.

Topical formulations or drug products can be used to deliver the MRGPRD agonists as described herein. Topical delivery includes delivery through the skin or mucosa, such as dermal, oral, nasal, optic, otic, or vaginal delivery routes. Suitable topical delivery formulations, and considerations for formulating such topical formulations are broadly-known (See, e.g., Remington: The Science and Practice of Pharmacy, The University of the Sciences in Philadelphia, Editor, Lippincott, Williams, & Wilkins, Philadelphia, Pa., 21st Edition (2005), describes compositions and formulations suitable for pharmaceutical delivery of one or more therapeutic compositions, particularly, chapters 65 ("Topical Drugs"), 43 ("Ophthalmic Preparations"), and 44 ("Medical Topicals"); Ueda, C. T. et al. "Topical and Transdermal Drug Products" *Pharmacopeial Forum* 35(3) [May-June 2009]; and Benson, Heather A E et al. "Topical and Transdermal Drug Delivery: From Simple Potions to Smart Technologies." *Current drug delivery vol.* 16,5 (2019): 444-460).

Alternatively, enteric, or delayed-release oral formulations or drug products can be used to deliver the MRGPRD agonists as described herein. In enteric or delayed-release formulations, the dosage form is an oral dosage form comprising a delayed-release coating, such as an enteric coating surrounding therapeutic agent, to delay release of the therapeutic agent until it reaches a target, such as the small intestine.

The dosage form may be provided as a unit dosage form, e.g., with lipid particles packaged within a syringe or ampoule for single or multiple use.

An oral dosage form can comprise a delayed-release coating to delay release of the therapeutic agent until it reaches the small intestine. The dosage form may be provided as a unit dosage form, e.g., with the therapeutic agent packaged in suitable packaging for single or multiple use. The dosage form also may be a suitable gastrointestinal dosage form, for example, as a suppository, enema, or through a feeding tube for delivery to the intestine of a patient.

A "delayed-release coating" on a pharmaceutical dosage form is a coating or barrier applied to an oral dosage form that delays release of the active components, e.g., therapeutic agent(s), of the dosage form. A delayed-release coating may be an "enteric coating" that remain intact in the stomach, surviving gastric pH and enzymatic processes, but dissolving in the environment of the small intestine. In the context of the pharmaceutical compositions, drug products, or dosage forms described herein, the object of delivery can be to delay release of the therapeutic agent until it passes into the small intestine. Due to the highly different rates of passage through the stomach depending on gastric content, and varying between individuals, an enteric-release coating or barrier may be preferred over a delayed-release barrier that depends on the passage of time rather than passage into the intestinal environment.

Polymers useful for enteric coatings can remain intact at low pH, but as the pH increases in the small intestine, the polymer swells or becomes soluble in the intestinal fluid. Non-limiting examples of materials used for enteric coatings include: cellulose acetate phthalate (CAP), poly(methacrylic acid-co-methyl methacrylate), cellulose acetate trimellitate (CAT), poly(vinyl acetate phthalate) (PVAP), and hydroxypropyl methylcellulose phthalate (HPMCP), fatty acids, waxes, shellac, plastics and plant fibers. Delayed release coatings also include polymeric coatings, such as, for example and without limitation, hydroxypropyl methylcellulose (HPMC), carboxymethylcellulose (CMC), or other polymeric compounds can be coated onto a quick-release core comprising a therapeutic agent. The thickness of the coating can be varied to produce a desirable delay in release of the therapeutic agent. Likewise, particles comprising a therapeutic agent can be embedded within HPMC, CMC, or other polymers useful in controlling release of a therapeutic agent. The delayed-release coating can be coated with an enteric coating to further control release of the therapeutic agent. Those of ordinary skill in the compounding arts can optimize the overall dosage form structure and release patterns in the dosage forms described herein, for any specific therapeutic agent.

The MRGPRD agonist may be delivered as an aerosol intranasally or by inhalation, e.g., for systemic treatment, or to treat a condition affecting the respiratory system, such as for nasal, nasopharyngeal, tracheal, bronchial, and/or pulmonary delivery of the MRGPRG agonist. Non-limiting examples of aerosols include dry powders, droplets produced by nebulizers or atomizers, aerosols produced by metered-dose aerosol inhalers, droplets produced by nasal inhalers. In one example, the MRGPRD agonist is delivered by a dry or liquid metered-dose inhaler that may be configured for delivery by inhalation from the mouth or nose (See, e.g., Remington: The Science and Practice of Pharmacy, The University of the Sciences in Philadelphia, Editor, Lippincott, Williams, & Wilkins, Philadelphia, Pa., 21st Edition (2005), for example, chapter 50 ("Aerosols")). Metered dose inhalers can include a propellant and an oral adaptor, for oral inhalation and typically delivery to the lungs. For nasal and nasopharyngeal delivery, the dosage form may be a spray device, such as a pump sprayer with a nasal adaptor for spraying into the nose. The composition in the nasal sprayer may comprise a thickening agent to facilitate retention in the nasal and nasopharynx.

Choice of delivery route can depend on the condition to be treated. While systemic delivery may be effective, focusing delivery on the affected tissue may be preferred. Skin conditions, such as urtucaria, contact dermatitis, cutaneous mastocytosis, eczema, or wounds can be treated topically, e.g., epicutaneously with a topical cream or ointment. Respiratory conditions, such as nasal allergies, asthma, or anaphylaxis can be treated by aerosol delivery to the nose or mouth. Intestinal conditions can be treated with delayed-release/enteric drug products, or suppositories. Systemic conditions, such as systemic mastocytosis may be treated by any effective routs, such as by oral administration, or inhalation of aerosols.

In addition to its use in down-regulating mast cell degranulation, it was found that β-ala induces wound healing-associated transcriptomic changes. As a consequence, it is believed that mala would be useful for enhancing wound healing, for example in the treatment of wounds, and in the treatment of slow-healing or non-healing wounds, such as diabetic wounds, as with diabetic foot ulcers. In one example, β-ala is administered topically to treat a wound, such as a diabetic wound, such as a diabetic foot ulcer.

In one aspect or embodiment, the MRGPRD agonist is β-ala, which may be preferred due to its superior MRGPRD activation as compared to GABA or β-AIBA. β-ala is broadly-available and is inexpensive. It has been taken orally as a nutraceutical for athletic performance enhancement, and to enhance general physical performance in elderly adults. Provided herein is the novel use of β-ala and related MRGPRD agonists, for treatment of conditions related to activation or over-activation of mast cells. While the β-ala, as it currently is sold as a powder or capsules, may be effective for systemic conditions, targeted topical and enteral delivery has heretofore been ignored.

As such, topical and enteral anti-inflammatory pharmaceutical compositions and drug products are described herein for targeted delivery of β-ala. As such a pharmaceutical composition containing β-ala, including pharmaceutically-acceptable salts thereof, and a pharmaceutically acceptable carrier is provided. The pharmaceutical compositions containing β-ala the recognition reagents are useful for treating a condition that arises from activation or over-activation of mast cells, as described herein.

A suitable dose of β-ala can be in the range of from about 0.001 milligrams (mg) per kilogram ($kg^{-1}$) body weight to about 1,000 mg per kilogram body weight of the recipient per day, for example in the range of about 1 to 50 mg $kg^{-1}$ body weight per day. Unit doses, and topical (local) treatments may range, for example, from about 0.001 mg to about 10,000 mg, or from 5 mg to 5,000 mg, with topical compositions, such as ointments or creams having a concentration ranging from, for example, 1 nanogram (ng) per milliliter ($ml^{-1}$) to 10 mg $ml^{-1}$, or ranging from 1% w/v (weight/volume) to 10% w/v, such as 5% w/v. A repeat-dose regimen may include administration of a therapeutic amount of the MRGPRD agonist on a regular basis, such as multiple times per day, every other day or once a year, or as needed. After an initial treatment regimen, the treatments can be administered on a less frequent basis. Certain factors can influence the dosage and timing required to effectively treat a subject, including but not limited to the severity of the condition, previous treatments, the general health and/or age of the subject, and other diseases present. Moreover, treatment of a subject with a therapeutically effective amount of a composition can include a single treatment or a series of treatments.

Pharmaceutical compositions and formulations for topical administration can include transdermal patches, ointments, lotions, creams, gels, drops, suppositories, sprays, liquids, and powders. Conventional pharmaceutical carriers, aqueous, powder, or oily bases, thickeners and the like can be used. The composition may be an ointment, in which the MRGPRD agonist is mixed in a carrier comprising petrolatum. Suitable topical formulations also include, but are not limited to, those in which the MRGPRD agonist is in admixture with a topical delivery agent such as lipids, liposomes, fatty acids, fatty acid esters, steroids, chelating agents, and surfactants. Suitable fatty acids and esters include but are not limited to arachidonic acid, oleic acid, eicosanoic acid, lauric acid, caprylic acid, capric acid, myristic acid, palmitic acid, stearic acid, linoleic acid, linolenic acid, dicaprate, tricaprate, monoolein, dilaurin, glyceryl 1-monocaprate, 1-dodecylazacycloheptan-2-one, an acylcarnitine, an acylcholine, or a $C_{1-20}$ alkyl ester (e.g., isopropylmyristate), monoglyceride or diglyceride, or pharmaceutically acceptable salt thereof. A person of skill in the pharmaceutical and compounding arts can prepare suitable formulations for delivery of the MRGPRD agonists as described herein.

No-limiting examples of MRGPRD agonists include β-ala, GABA, and β-AIBA. Additional MRGPRD agonists may be known or developed. Such additional MRGPRD agonists are expected to exhibit efficacy in treatment of conditions related to activation or over-activation of mast cells. Efficacy of MRGPRD agonists may be tested as described herein, for example, though other assays may be used to determine the ability of a compound to act as a MRGPRD agonist and to determine its efficacy in treatment of conditions related to activation or over-activation of mast cells.

Beta-alanine (β-ala) also is known as 3-aminopropanoic acid, e.g., having the structure:

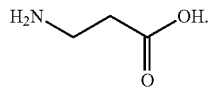

In the methods and compositions provided herein, β-ala or pharmaceutically-acceptable salts thereof are useful.

Non-limiting examples of pharmaceutically-acceptable salts of β-ala include, without limitation, β-ala hydrochloride or other acid addition salts disclosed in U.S. Pat. No. 7,956,218 B2, such as malate, fumarate, or citrate, with the structure:

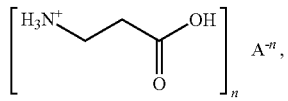

where n is, e.g., 1, 2 or 3, and A is a pharmaceutically-acceptable counterion. As an example, n is 2 when A is malate or fumarate, and 3 when A is citrate.

Gamma-aminobutyric acid (GABA, or 4-aminobutanoic acid), and pharmaceutically-acceptable salts thereof, also are useful in the methods and compositions provided herein. The structures of GABA (left), and an exemplary acid addition salt thereof (right), are as follows:

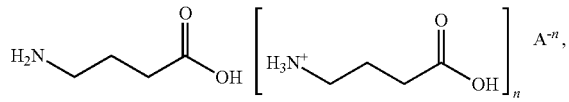

where n is, e.g., 1, 2 or 3, and A is a pharmaceutically-acceptable counterion. As an example, n is 2 when A is malate or fumarate, and 3 when A is citrate.

Beta-aminoisobutyric acid (β-AIBA, or 3-aminoisobutyric acid), and pharmaceutically-acceptable salts thereof, also are useful in the methods and compositions provided herein. The structures of β-AIBA (left), and an exemplary acid addition salt thereof (right), are as follows:

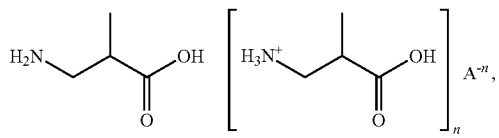

where n is, e.g., 1, 2 or 3, and A is a pharmaceutically-acceptable counterion. As an example, n is 2 when A is malate or fumarate, and 3 when A is citrate.

5-oxoeicosatetraenoic acid (5-oxoETE), or a pharmaceutically-acceptable salt thereof, also are useful in the methods and compositions provided herein. The structure of 5-oxo-ETE (top), and an exemplary base addition salt thereof (bottom), are as follows:

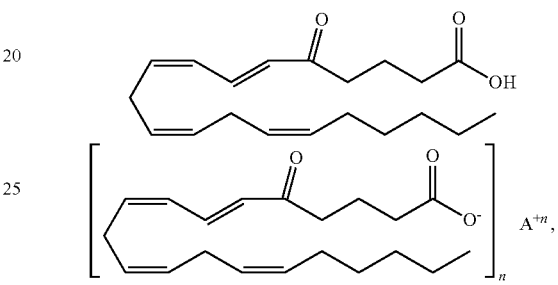

where n is, e.g., 1, 2 or 3, and A is a pharmaceutically-acceptable counterion. As an example, n is 2 when A is malate or fumarate, and 3 when A is citrate.

Pharmaceutically acceptable salts of any of the compounds described herein also may be used in the methods described herein. Pharmaceutically acceptable salt forms of the compounds described herein may be prepared by conventional methods known in the pharmaceutical arts, and include as a class veterinarily acceptable salts. For example and without limitation, where a compound comprises a carboxylic acid group, a suitable salt thereof may be formed by reacting the compound with an appropriate base to provide the corresponding base addition salt. Non-limiting examples include: alkali metal hydroxides, such as potassium hydroxide, sodium hydroxide and lithium hydroxide; alkaline earth metal hydroxides, such as barium hydroxide and calcium hydroxide; alkali metal alkoxides, such as potassium ethanolate and sodium propanolate; and various organic bases such as piperidine, diethanolamine, and N-methylglutamine.

Acid and base addition salts may be prepared by contacting the free base form with a sufficient amount of a desired acid or base to produce the salt in a manner known in the art. The free base may be regenerated by contacting the salt form with a base or acid (depending on the nature of the salt) and isolating the free base. The free base forms differ from their respective salt forms somewhat in certain physical properties such as solubility in polar solvents, but otherwise the salts are equivalent to their respective free base forms for purposes described herein.

Compounds comprising basic nitrogen-containing groups may be quaternized with such agents as $C_{1-4}$ alkyl halides, such as methyl, ethyl, iso-propyl and tert-butyl chlorides, bromides and iodides; $C_{1-4}$ alkyl sulfate such as dimethyl, diethyl and diamyl sulfates; $C_{10-18}$ alkyl halides, such as decyl, dodecyl, lauryl, myristyl and stearyl chlorides, bromides and iodides; and aryl-$C_{1-4}$ alkyl halides, such as benzyl chloride and phenethyl bromide. Such salts permit the preparation of both water-soluble and oil-soluble compounds.

Non-limiting examples of pharmaceutically-acceptable base salts include: aluminum, ammonium, calcium, copper, ferric, ferrous, lithium, magnesium, manganic, manganous, potassium, sodium, and zinc salts. Salts derived from pharmaceutically acceptable organic non-toxic bases include, without limitation: salts of primary, secondary, and tertiary amines, substituted amines including naturally occurring substituted amines, cyclic amines, and basic ion exchange resins, such as arginine, betaine, caffeine, chloroprocaine, choline, N,N'-dibenzylethylenediamine (benzathine), dicyclohexylamine, diethanolamine, diethylamine, 2-diethylaminoethanol, 2-dimethylaminoethanol, ethanolamine, ethylenediamine, N-ethylmorpholine, N-ethylpiperidine, glucamine, glucosamine, histidine, hydrabamine, iso-propylamine, lidocaine, lysine, meglumine, N-methyl-D-glucamine, morpholine, piperazine, piperidine, polyamine resins, procaine, purines, theobromine, triethanolamine, diethylamine, trimethylamine, tripropylamine, and tris-(hydroxymethyl)-methylamine (tromethamine).

Acid addition salts may be prepared by treating a compound with pharmaceutically acceptable organic and inorganic acids, including, without limitation: hydrohalides, such as hydrochloride, hydrobromide, hydroiodide; other mineral acids and their corresponding salts such as sulfates, nitrates, and phosphates; alkyl- and mono-arylsulfonates, such as ethanesulfonate, toluenesulfonate, and benzenesulfonate; and other organic acids and their corresponding salts, such as acetate, tartrate, maleate, succinate, citrate, benzoate, salicylate, and ascorbate.

Non-limiting examples of pharmaceutically-acceptable acid salts include: acetate, adipate, alginate, arginate, aspartate, benzoate, besylate (benzenesulfonate), bisulfate, bisulfite, bromide, butyrate, camphorate, cannphorsulfonate, caprylate, chloride, chlorobenzoate, citrate, cyclopentanepropionate, digluconate, dihydrogenphosphate, dinitrobenzoate, dodecylsulfate, ethanesulfonate, fumarate, galacterate, galacturonate, glucoheptanoate, gluconate, glutamate, glycerophosphate, hemisuccinate, hemisulfate, heptanoate, hexanoate, hippurate, hydrochloride, hydrobromide, hydroiodide, 2-hydroxyethanesulfonate, iodide, isethionate, iso-butyrate, lactate, lactobionate, malate, maleate, malonate, mandelate, metaphosphate, methanesulfonate, methylbenzoate, monohydrogenphosphate, 2-naphthalenesulfonate, nicotinate, nitrate, oxalate, oleate, pamoate, pectinate, persulfate, phenylacetate, 3-phenylpropionate, phosphate, phosphonate, and phthalate.

Multiple salts forms are also considered to be pharmaceutically-acceptable salts. Common, non-limiting examples of multiple salt forms include: bitartrate, diacetate, difumarate, dimeglumine, diphosphate, disodium, and trihydrochloride.

As such, "pharmaceutically acceptable salt" as used herein is intended to mean an active ingredient (drug) comprising a salt form of any compound as described herein. The salt form preferably confers to the improved and/or desirable pharmacokinetic/pharmodynamic properties of the compounds described herein.

MRGPRD refers to "MAS related GPR family member D", for example, as described in Gene ID: 116512. MRGPRD also is known as the beta-alanine receptor. MRGPRD is a G protein-coupled receptor expressed in specific subpopulations of sensory neurons. MRGPRD marks a distinct subset of sensory neurons that transmit polymodal nociceptive information from the skin epidermis to the substantia gelatinosa (SG, lamina II) of the spinal cord. Moreover, Mrgprd-expressing (Mrgprd(+)) neurons are required for the full expression of mechanical but not thermal nociception (Wang H, et al. Mrgprd-expressing polymodal nociceptive neurons innervate most known classes of substantia gelatinosa neurons. *J Neurosci.* 2009; 29(42)13202-13209).

Bela-alanine decreases forskolin-stimulated cAMP production in cells expressing MRGPRD, suggesting that the receptor couples with G-protein G(q) and G(i) Agonists for MRGPRD include β-ala, GABA, and β-AIBA though GABA and β-AIBA are significantly weaker than β-ala in their activity as MRGPRD agonists. It is noted that β-ala, GABA, and β-AIBA are exemplary MRGPRD agonists, and other MRGPRD agonists are expected to act in the manner described herein for down-regulating mast cell activation (degranulation).

Provided herein is a method of treating a patient having a condition associated with activation or over-activation of mast cells. The method comprises administering to the patient an amount of as MRGPRD agonist effective to down-regulate mast cell degranulation in the patient. Examples of useful MRGPRD agonists include, without limitation, beta alanine (β-ala), or a pharmaceutically-acceptable salt thereof, gamma-aminobutyric acid (GABA), or a pharmaceutically-acceptable salt thereof, and beta aminoisobutyric acid (β-AIBA), or a pharmaceutically-acceptable salt thereof. Combination of any of the aforementioned compounds may be used to treat the patient. Examples of may be, without limitation, an urticarial disease, a mastocytosis, a food allergy, anaphylaxis, irritable bowel syndrome.

Also provided herein are topical, delayed-release, or enteric pharmaceutical formulations comprising β-ala for targeting delivery of the β-ala to the skin or mucosa, for addressing specific conditions associated with activation or over-activation of mast cells. The formulation may be a unit dosage form, a spray device, an aerosol device, a metered-dose inhaler, spray, or aerosol device, or a nebulized. The formulation may be a topical formulation, such as a lotion, cream, ointment, eyedrops, ear drops, bandage, etc. Spray or aerosol devices may comprise a propellant and/or rheology modifiers. Topical formulations may comprise permeation enhancers, rheology modifiers, antibiotics, anti-inflammatories, or anesthetics. Any formulation may include any useful additional active agent.

Non-limiting examples of antibiotics useful in the described formulations include: acyclovir, afloxacin, ampicillin, amphotericin B, atovaquone, azithromycin, ciprofloxacin, clarithromycin, clindamycin, clofazimine, dapsone, diclazuril, doxycycline, erythromycin, ethambutol, fluconazole, fluoroquinolones, foscarnet, ganciclovir, gentamicin, iatroconazole, isoniazid, ketoconazole, levofloxacin, lincomycin, miconazole, neomycin, norfloxacin, ofloxacin, paromomycin, penicillin, pentamidine, polymixin B, pyrazinamide, pyrimethamine, rifabutin, rifampin, sparfloxacin, streptomycin, sulfadiazine, tetracycline, tobramycin, trifluorouridine, trimethoprim sulphate, Zn-pyrithione, ciprofloxacin, norfloxacin, afloxacin, levofloxacin, gentamicin, tobramycin, neomycin, erythromycin, trimethoprim sulphate, polymixin B and silver salts such as chloride, bromide, iodide and periodate.

The formulation may include an analgesic or anesthetic, such as a local anesthetic. Analgesics, including, without limitation, acetaminophen, tramadol or cannabinoids; Non-Steroidal Anti-Inflammatory Drugs (NSAIDs) including, without limitation, bromfenac, colchicine, diclofenac, diflunisal, etodolac, fenoprofen, flurbiprofen, ibuprofen, indomethacin, indoprofen, ketoprofen, ketorolac, meclofenamate, mefenamic acid, meloxicam, nabumetone, naproxen, nepafenac, oxaprozin, phenylbutazone, piroxicam, salicylamide, sulindac, tolmetin; COX-2 Inhibitors including, without limitation, celecoxib, rofecoxib, and etoricoxib; Narcotic Pain Medications (Painkillers) including, without limitation, buprenorphine, butorphanol, codeine, hydrocodone, hydromorphone, levorphanol, meperidine, methadone, morphine, nalbuphine, oxycodone, oxymorphone, pentazocine, propoxyphene, tapentadol; and topical analgesics or anesthetics, including, without limitation, ambucaine, amylocaine, articaine, benzonatate, bupivacaine, butacaine, butanilicaine, chloroprocaine, cinchocaine, cocaine, cuclomethylcaine, dimethocaine, diperodon, benzocaine, dibucaine, lidocaine, oxybuprocaine, butamben, pramoxine, proparacaine, proxymetacaine, tetracaine, meprylcaine, metabutoxycaine, nitracaine, orthocaine, oxetacaine, paraethoxycaine, phenacaine, piperocaine, piridocaine, pramocaine, prilocaine, primacaine, procainamide, procaine, propoxycaine, pyrrocaine, quinisocaine, ropivacaine, tolycaine, trimecaine, tropacocaine, and capsaicin.

EXAMPLE 1

Agonism of MRGPRD Neurons Suppresses Mast Cell Activation

In the skin there are a variety of sensory afferent neurons that are specialized to respond to specific stimuli that are then interpreted as sensations such as pain or itch. We have discovered that a specific subset of neurons that innervate the epidermis of the skin as well as the intestine (and other organs) are required to suppress the activation of mast cells. These neurons express the receptor Mas related G protein receptor D (MRGPRD). When MRGPRD-expressing neurons are genetically ablated in mice, heightened mast cell activation is observed. Moreover, we found that a small molecule MRGPRD agonist, β-alanine, is sufficient to suppress cutaneous mast cell function in wild-type mice.

As described herein, the application of small molecule agonists of MRGPRD can be used to suppress mast cell activation.

Potential uses include the suppression of cutaneous inflammation in the following contexts:
all forms of acute or chronic urticaria,
all types of urticarial diseases,
all subtypes of mastocytosis,
pseudo-allergy,
all forms of dermatitis including contact and atopic dermatitis, wound healing, rosacea, acne and psoriasis.

Other uses in the skin include the suppression of neurogenic inflammation, pain, and itch. Uses in other tissues include treatment of asthma, angioedema, and diarrhea. Further uses include treatment of other diseases where mast cells play a pathogenic role.

MRGPRD agonists could be given topically, orally, or parentally in any effective dose, dosage form, route of treatment, or treatment schedule.

EXAMPLE 2

β-Alanine Suppresses 48/80-Mediated Mast Cell Degranulation

C57BL/6 mice were either pre-treated by i.d. injection of b-alanine or vehicle for 2 days followed by i.d. administration of compound 48/80. Compound 48/80, the condensation product of N-methyl p-methoxyphenethylamine and formaldehyde, is a well-known chemical that induces rapid mast cell degranulation and associated edema. The degree of edema in the skin is measured by the amount of Evan's blue dye in the skin. As shown in FIG. 1, compound 48/80 increased Evan's blue dye in vehicle treated mice (compare column 1 with 2) but pre-treatment with β-alanine inhibited this effect (compare column 3 and 4). In mice that lack MRGPRD neurons, β-alanine had no effect on 48/80's ability to activate mast cells (compare columns 5 and 6). This is a specificity control since the neurons that express the receptor for β-alanine are absent.

EXAMPLE 3

β-Alanine (MRGPRD Agonist) Suppresses DNFB Contact Hypersensitivity In Vivo (Mouse Model of Allergic Contact Dermatitis)

Figure 2:
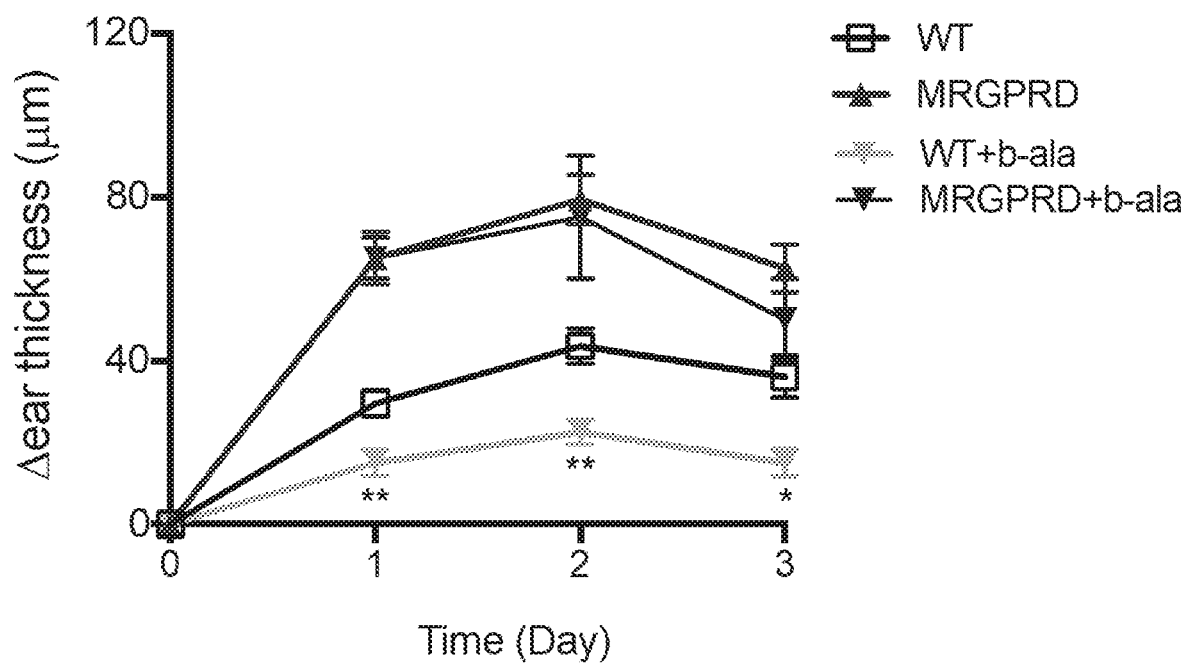
FIG. 2 is a graph showing that β-alanine suppresses DNFB Contact hypersensitivity in vivo, as described in Example 3. Error bars+/−SEM. **p<0.01; *p<0.05.

Referring to FIG. 2, cohorts of C57BL/6 mice (n=5) were either pre-treated by i.d. injection of b-alanine (WT+b-ala) or vehicle (WT) on the abdomen for 2 days followed by sensitization at the same site with 0.2% DNFB (a chemical sensitizer). Five days later 0.2% DNFB was applied to the ear. The increased degree of ear swelling on the indicated day compared to ear thickness prior to application of DNFB was measured. Increased ear thickness was employed a surrogate for the amount of immune response to DNFB was measured. As a specificity control, MRGPRD-DTR mice treated with DT to ablate MRGPRD-expressing neurons (labeled MRGPRD in FIG. DD), and were treated similarly (MRGPRD and MRGPRD+b-ala). Ear thickness was increased overall in these mice, consistent with hyperactive mast cells. Importantly, injection of β-alanine had no effect in MRGPRD-ablated mice, thereby demonstrating that the effect of β-alanine requires the presence of MRGPRD-expressing neurons. In WT mice, β-alanine had a significant effect on ear swelling, and, thus, immune response.

EXAMPLE 4

5% Topical β-Alanine Suppresses Mast Cell Degranulation in Mice

Figure 3:
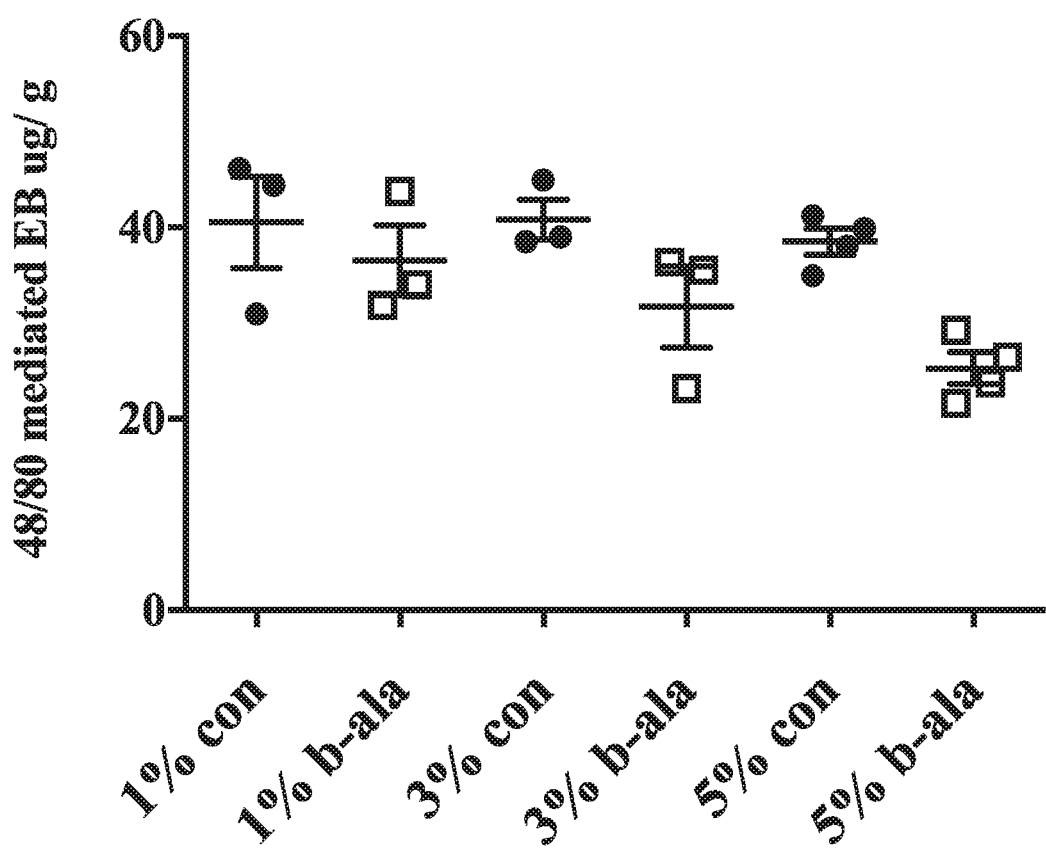
FIG. 3 is a graph showing that 5% topical b-alanine suppresses mast cell degranulation in mice, as described in Example 4. Values represent the amount of dermal Evan's blue dye in μg per g of tissue. **p<0.01. Each symbol represents data from an individual animal.

As shown in FIG. 3, mice were treated on shaved flank skin twice daily for 2 days with a topical preparation of β-alanine at the indicated concentration ('b-ala', open squares) or with vehicle alone ('con', closed circles). Mice were then given Evans' blue dye i.v. followed by an intradermal injection of compound 48/80. Ten minutes later, the amount of Evans' blue dye present in the skin ($\mu g \cdot g^{-1}$ of tissue) as an indication of the extent of mast cell degranulation was determined by skin biopsy, enzymatic digestion, and calorimetric evaluation.

EXAMPLE 5

B-Alanine Induces Wound Healing-Associated Transcriptomic Changes

Figure 4:
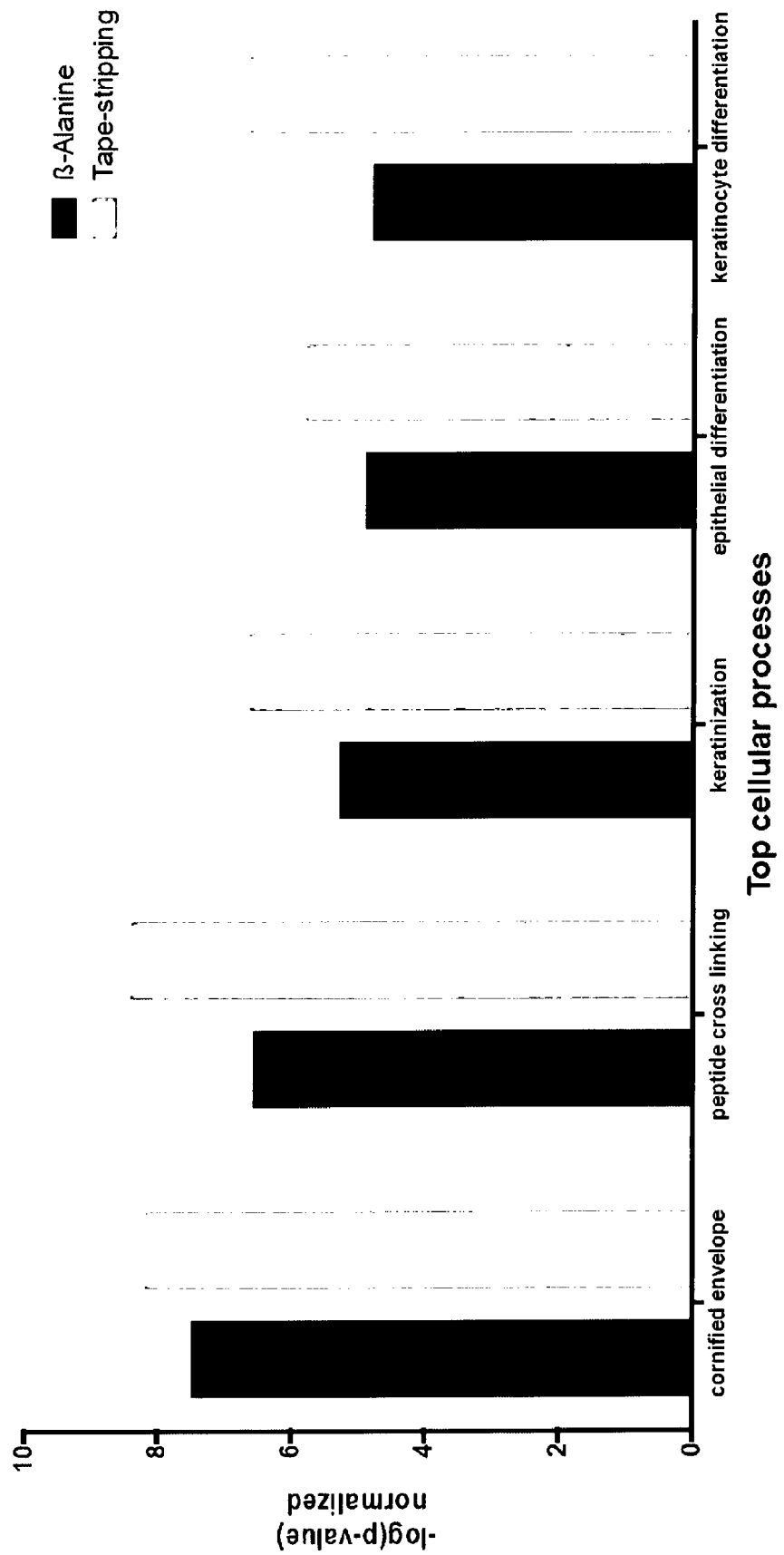
FIG. 4 is a graph showing that β-alanine induces wound healing-associated transcriptome changes, as described in Example 5.

Wild type C57BL/6 mice were injected with 100 mM β-alanine or vehicle twice daily for 2 days. Skin at the treated sites were harvested and mRNA was obtained and subjected to RNAseq. Genes with increased gene expression in the β-alanine treated group were anayzed by pathway analysis. The $-\log_2$ p values normalized to gene number are shown in FIG. 4 (black bars). A similar analysis was performed using published RNAseq data (Naik S, et al. Nature 2017 Oct. 26; 550(7677):475-480. PMID: 29045388) obtained from the skin of mice harvested 6 hours after tape stripping or sham control (gray bars).

The strong similarity of pathways activated following β-alanine administration and tape stripping strongly suggests that β-alanine activates wound healing pathways.

The present invention has been described with reference to certain exemplary embodiments, dispersible compositions and uses thereof. However, it will be recognized by those of ordinary skill in the art that various substitutions, modifications or combinations of any of the exemplary embodiments may be made without departing from the spirit and scope of the invention. Thus, the invention is not limited by the description of the exemplary embodiments.

What is claimed is:

1. A method of treating a patient having a condition associated with activation or over-activation of mast cells, or for reducing, or treating itch in a patient comprising administering to the patient an amount of an MRGPRD agonist effective to down-regulate mast cell degranulation in the patient, wherein the MRGPRD agonist is: beta-alanine (β-ala), or a pharmaceutically-acceptable salt thereof; gamma-aminobutyric acid (GABA), or a pharmaceutically-acceptable salt thereof; beta aminoisobutyric acid (β-AIBA), or a pharmaceutically-acceptable salt thereof; 5-oxoeicosatetraenoic acid (5-oxoETE), or a pharmaceutically-acceptable salt thereof; or a combination of any of the preceding.

2. The method of claim 1, wherein the condition associated with activation or over-activation of mast cells is a urticarial disease, and the MRGPRD agonist is administered to the patient topically or systemically.

3. The method of claim 1, wherein the condition associated with activation or over-activation of mast cells is mastocytosis, and the MRGPRD agonist is administered to the patient topically or systemically.

4. The method of claim 1, wherein the condition associated with activation or over-activation of mast cells is a food allergy, and the MRGPRD agonist is administered to the patient enterically.

5. The method of claim 1, wherein the condition associated with activation or over-activation of mast cells is acute or chronic urticaria, mastocytosis or any subtype of mastocytosis, pseudo-allergy, any form of dermatitis, a wound, rosacea, acne, or psoriasis, comprising administering to the patient an amount of an MRGPRD agonist effective to inhibit or reduce inflammation in the patient.

6. The method of any claim 1, wherein from 5 mg to 5,000 mg of the MRGPRD agonist is administered to the patient.

7. The method of claim 1, wherein the MRGPRD agonist is administered to the patient for at least one week.

8. A method of treating a wound in a patient, comprising administering to the wound an amount of an MRGPRD agonist effective to increase wound healing in the patient, wherein the MRGPRD agonist is beta-alanine (β-ala), or a pharmaceutically-acceptable salt thereof.

9. The method of claim 8, wherein the MRGPRD agonist is formulated as a topical pharmaceutical composition.

10. The method of claim 8, wherein the wound is a non-healing wound.

11. The method of claim 8, wherein the patient is diabetic, and the wound optionally is a foot ulcer.

12. A topical composition, or an aerosol or spray pharmaceutical formulation or device comprising a composition, comprising beta-alanine, or a pharmaceutically-acceptable salt thereof, in combination with a pharmaceutically-acceptable carrier.

13. The topical composition of claim 12, in an amount effective to treat a condition associated with activation or over-activation of mast cells selected from acute or chronic urticaria, mastocytosis or any subtype of mastocytosis, pseudo-allergy, any form of dermatitis, wound healing, rosacea, acne, or psoriasis.

14. The composition of claim 12, wherein the composition is an ointment, a cream, a lotion, a spray, a gel, or a wound dressing.

15. An aerosol or spray pharmaceutical formulation or device as claimed in claim 12, comprising beta-alanine, or a pharmaceutically-acceptable salt thereof, in combination with a pharmaceutically-acceptable carrier.

16. The pharmaceutical formulation or device of claim 15, in the form of a sprayer.

17. The composition of claim 12 in the form of a delayed-release or enteric formulation comprising beta-alanine, or a pharmaceutically-acceptable salt thereof, in a delayed-release and/or an enteric composition and/or within a delayed-release and/or an enteric coating, for enteric release of the beta-alanine in a patient.

18. The method of claim 1, for reducing, or treating pain or itch in a patient, such as neurogenic inflammation, pain, or itch in a patient, comprising administering to the patient an amount of an MRGPRD agonist effective to reduce, or treat pain or itching in a patient.

19. The method of claim 1, wherein the condition is rosacea or edema.

20. A method of treating pain in a patient comprising administering to the patient an amount of an MRGPRD agonist effective to down-regulate mast cell degranulation in the patient, wherein the MRGPRD agonist is beta aminoisobutyric acid (β-AIBA), or a pharmaceutically-acceptable salt thereof; 5-oxoeicosatetraenoic acid (5-oxoETE), or a pharmaceutically-acceptable salt thereof; or a combination of any of the preceding.

* * * * *